(Model.)
W. E. BROOKE.
SAW TOOTH.
No. 417,468. Patented Dec. 17, 1889.
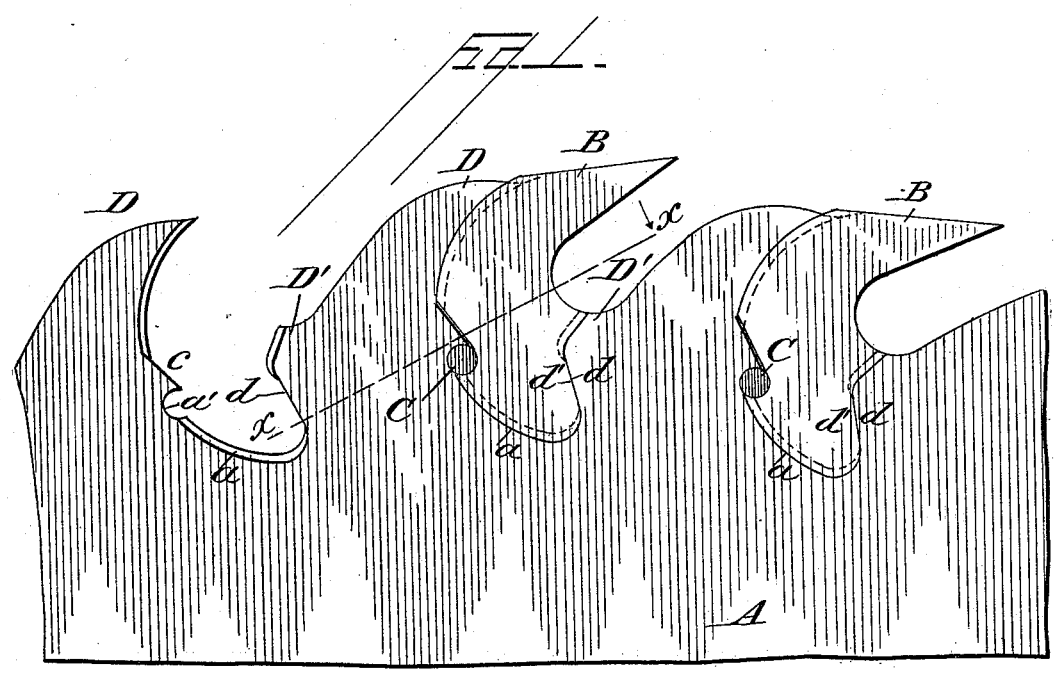
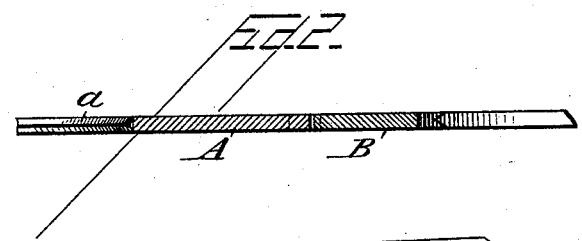
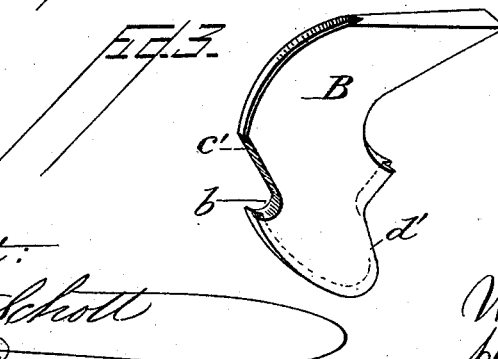
Attest:
F. H. Schott
W. L. Boyden
Inventor
William E. Brooke
per John C. Pasker
Atty

UNITED STATES PATENT OFFICE.

WILLIAM E. BROOKE, OF TRENTON, NEW JERSEY, ASSIGNOR TO THE AMERICAN SAW COMPANY, OF SAME PLACE.

SAW-TOOTH.

SPECIFICATION forming part of Letters Patent No. 417,468, dated December 17, 1889.

Application filed October 3, 1889. Serial No. 325,826. (Model.)

*To all whom it may concern:*

Be it known that I, WILLIAM E. BROOKE, a citizen of the United States, residing at Trenton, in the county of Mercer and State of New Jersey, have invented certain new and useful Improvements in Saw-Teeth; and I do hereby declare the following to be a full, clear, and exact description of the invention, such as will enable others skilled in the art to which it appertains to make and use the same.

My present invention has reference to certain improvements in that class of saws which have movable, detachable, or insertible saw-teeth, the object thereof being to so construct and secure the saw-teeth as to multiply or increase the number of them with which a saw plate or blade may be effectively provided, thus enabling the saw to stand a greater feed at each revolution, and thereby adding to its capacity for work; and to this end the invention comprises the construction, combination, and arrangement of parts, substantially as will be hereinafter fully described and claimed.

In the accompanying drawings, illustrating my invention, Figure 1 is a side view of a section of a saw with two teeth inserted in their respective recesses, while a third recess is left vacant to show its form and outline more distinctly. Fig. 2 is a sectional plan view on the line $x\ x$ of Fig. 1. Fig. 3 is a detail perspective view of my improved removable saw-tooth.

Similar letters of reference designate corresponding parts in the different figures.

A represents a portion of a saw plate or blade; B, one of the removable teeth, and C the rivet or securing-pin for fastening the tooth in position.

The edge or periphery of the saw-plate A is provided with a series of recesses $a$, each of which corresponds in general outline with the adjacent edge of the tooth B, which the recess is designed to receive. These recesses lie in a direction substantially at right angles to the edge of the saw-plate. At or near the middle of each recess $a$ is a semicircular sub recess or opening $a'$, opposite which, in the tooth B, is a similar recess $b$, that, together with the recess $a'$, forms a circular opening of the proper shape and size to receive the round or circular rivet C, which serves to hold the parts together. Adjacent to the sub-recess $a'$ in recess $a$, and opposite to the throat, is a flat-faced lug or projection $c$, inclined obliquely to the general direction of recess $a$, opposite which lug is an inclined flat face $c'$ on the tooth B, adjacent to the recess $b$ therein. The flat face $c'$ is adapted when the tooth is inserted in the saw to come into close proximity to the flat lug $c$, with which it will lie parallel, but not to touch the latter—that is to say, the tooth has no bearing upon the lug, but there is a slight intervening space between them, as shown. This construction, whereby the tooth has no bearing on the lug, there being an intervening space between them, but instead has a bearing on the saw-plate at each side of the lug, is found to be an improvement in the arrangement of saw-teeth and a very much better device than if the tooth rested on the lug. It makes a better and firmer combination and adds to the strength of the tooth. It enables the tooth to stand firmly during the operation of swaging, whereby the point of the tooth is expanded or widened. If the tooth rested on the lug, the rebounding of said tooth during the operation of swaging would tend to weaken the combination, loosen the rivet, and thus damage the saw; but this difficulty is effectually overcome by providing the slight space between the tooth and lug, as already stated.

The tooth B is of a general semi-lunar form and enters the saw in a direction substantially perpendicular to the edge thereof, the inner end or heel of the tooth being truncated or abruptly cut off, so as to occupy less space than is the case with many teeth in common use, the curvature of whose inner end is extended along the saw-periphery, thus consuming more space. By my construction I save room and am enabled to employ more teeth.

The tooth B is expanded or swaged at its point in the usual manner, so that it will cut a kerf of sufficient width to clear the saw-plate, thus obviating friction and consequent heating of the plate. When inserted into the saw-plate, it fits neatly between the opposite projections D and D' of the said plate.

The tooth is seated in the usual manner by means of a triangular or V-shaped groove in its edge, which fits over a correspondingly-beveled tongue on the edge of the recess in the saw-plate. The inner portion of the recess and also the projecting parts D and D' are provided with this tongue, which enters the groove in the contiguous edges of the tooth. Between the tongued projection D' and the inner tongued portion of the recess is a flat untongued part $d$, against which a flat contiguous edge $d'$ of the tooth abuts neatly. It will thus be manifest that I insert the movable teeth into the saw-plate in such a manner that all possible space is utilized. Each tooth occupies the minimum of room. I am thus permitted to provide a saw with more teeth than has been usual heretofore. In doing this I do not weaken the connection of the tooth with the plate or sacrifice in any degree the security attained by other modes of insertion; but I enable the saw to stand greater feed and do better and stronger work.

It is very desirable that circular saws as constructed and operated nowadays should be provided with as many teeth as possible; hence the shortening of the heel of my tooth enables me to achieve the very important result of multiplying the number of teeth in the saw.

The tooth does not bear upon the lug; but the rivet, in connection with said lug and the tooth, forms a firm combination. This makes the tooth stronger in the throat and conduces to the value of the present arrangement.

Having thus described my invention, what I claim as new, and desire to secure by Letters Patent, is—

1. The combination, with the saw-plate having a recess with a sub-recess and a flat lug opposite the throat, of a saw-tooth having a recess forming with said sub-recess an opening for the rivet, and a flat face opposite to but not bearing upon the lug, there being an intervening space between them, and the rivet for holding the tooth in place, all substantially as described.

2. The combination of the saw-plate A, having recess $a$, with sub-recess $a'$, and the flat lug $c$, and having also projections D and D', the saw-tooth B, having recess $b$, and flat face $c'$, which is opposite to but not bearing on lug $c$, said recesses $a'$ and $b$ together forming an opening for the rivet, and said tooth B having a shortened heel to permit more teeth to be arranged in the saw-periphery, and the rivet C in the aforesaid opening, substantially as described.

3. The combination of saw-plate A, having recess $a$, with sub-recess $a'$, the flat lug $c$, and the projections D D', said projections and the inner portion of recess $a$ being tongued to enter V-grooves in the tooth, there being an untongued part $d$ between the projections D' and the inner tongued portion of the recess, the shortened tooth B, having recess $b$, flat face $c'$, opposite to but not bearing on lug $c$, and flat face $d'$, bearing on the untongued edge $d$, and the rivet C, for holding the tooth in place, substantially as described.

In testimony whereof I affix my signature in presence of two witnesses.

WM. E. BROOKE.

Witnesses:
ISAAC F. BISSELL,
ALFRED L. ECCLES.